(12) United States Patent
 Messing et al.

(10) Patent No.: US 10,884,632 B2
(45) Date of Patent: Jan. 5, 2021

(54) TECHNIQUES FOR DETERMINING THE EXTENT OF DATA LOSS AS A RESULT OF A DATA STORAGE SYSTEM FAILURE

(71) Applicant: INTERNATIONAL BUSINESS MACHINES CORPORATION, Armonk, NY (US)

(72) Inventors: Deborah A. Messing, Tel Aviv (IL); Itzhack Goldberg, Hadera (IL); Harry R. McGregor, Tucson, AZ (US); Christopher B. Moore, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 16/184,810

(22) Filed: Nov. 8, 2018

(65) Prior Publication Data

US 2020/0150876 A1    May 14, 2020

(51) Int. Cl.
 *G06F 12/02*      (2006.01)
 *G06F 3/06*       (2006.01)
 *G06F 12/0806*    (2016.01)
 *G06F 16/901*     (2019.01)

(52) U.S. Cl.
 CPC .......... *G06F 3/0616* (2013.01); *G06F 3/0619* (2013.01); *G06F 3/0631* (2013.01); *G06F 3/0679* (2013.01); *G06F 12/0806* (2013.01); *G06F 16/901* (2019.01)

(58) Field of Classification Search
 CPC combination set(s) only.
 See application file for complete search history.

(56) References Cited

U.S. PATENT DOCUMENTS

| 2015/0121130 | A1 | 4/2015  | Xiao et al.       |
| 2017/0046260 | A1 | 2/2017  | Umeda et al.      |
| 2017/0286362 | A1 | 10/2017 | Friedman et al.   |
| 2017/0329706 | A1 | 11/2017 | Nemawarkar et al. |

*Primary Examiner* — Yong J Choe
(74) *Attorney, Agent, or Firm* — Brian F. Russell; Jason Sosa (57) ABSTRACT

A technique for operating a data storage system includes generating information that identifies data that is currently stored in a write cache of the data storage system. The information is stored in a data structure associated with the data storage system. In response to a failure of the data storage system, the information in the data structure is accessed to identify the data that was lost in the failure.

20 Claims, 9 Drawing Sheets

| LUN0 | LUN1 | LUN2 | LUN3 | LUN4 |
|------|------|------|------|------|
| 1 | 0 | 1 | 0 | 0 |

| LUN0 | LUN1 | LUN2 | LUN3 | LUN4 |
|------|------|------|------|------|
| 000 | 100 | 000 | 010 | 001 |

|       | LUN0 | LUN1 | LUN2 | LUN3 | LUN4 | Generation No. (1st Iteration) | Generation No. (2nd Iteration) |
|-------|------|------|------|------|------|-------------------------------|-------------------------------|
| 600   | 000  | 100  | 000  | 010  | 001  | 0                             | 3                             |
| 602   | 010  | 001  | 100  | 000  | 000  | 1                             | 4                             |
| 604   | 100  | 010  | 001  | 011  | 000  | 2                             | 5                             |

TECHNIQUES FOR DETERMINING THE EXTENT OF DATA LOSS AS A RESULT OF A DATA STORAGE SYSTEM FAILURE

BACKGROUND OF THE INVENTION

This disclosure relates to data storage systems and, more specifically, to determining the extent of data loss as a result of a data storage system failure.

NAND flash memory is an electrically programmable and erasable non-volatile memory technology that stores one or more bits of data per memory cell as a charge on the floating gate of a transistor or a similar charge trap structure. In a typical implementation, a NAND flash memory array is organized in blocks (also referred to as "erase blocks") of physical memory, each of which includes multiple physical pages each in turn containing a multiplicity of memory cells. By virtue of the arrangement of the word and bit lines utilized to access memory cells, flash memory arrays can generally be programmed on a page basis, but are erased on a block basis.

As is known in the art, blocks of NAND flash memory must be erased prior to being programmed with new data. A block of NAND flash memory cells is erased by applying a high positive erase voltage pulse to the p-well bulk area of the selected block and by biasing to ground all of the word lines of the memory cells to be erased. Application of the erase pulse promotes tunneling of electrons off of the floating gates of the memory cells biased to ground to give them a net positive charge and thus transition the voltage thresholds of the memory cells toward the erased state. Each erase pulse is generally followed by an erase verify operation that reads the erase block to determine whether the erase operation was successful, for example, by verifying that less than a threshold number of memory cells in the erase block have been unsuccessfully erased. In general, erase pulses continue to be applied to the erase block until the erase verify operation succeeds or until a predetermined number of erase pulses have been used (i.e., the erase pulse budget is exhausted).

A NAND flash memory cell can be programmed by applying a positive high program voltage to the word line of the memory cell to be programmed and by applying an intermediate pass voltage to the memory cells in the same string in which programming is to be inhibited. Application of the program voltage causes tunneling of electrons onto the floating gate to change its state from an initial erased state to a programmed state having a net negative charge. Following programming, the programmed page is typically read in a read verify operation to ensure that the program operation was successful, for example, by verifying that less than a threshold number of memory cells in the programmed page contain bit errors. In general, program and read verify operations are applied to the page until the read verify operation succeeds or until a predetermined number of programming pulses have been used (i.e., the program pulse budget is exhausted).

Small Computer System Interface (SCSI) defines a set of standards for physically connecting and transferring data between computers and peripheral devices. Conventionally, SCSI has commonly been used for hard disk drives and tape drives. Today, SCSI is also used for flash memory based data storage systems. The SCSI standard defines command sets for specific peripheral device types. The SCSI command architecture was originally defined for parallel SCSI buses, but has been adapted with minimal change for use with Internet SCSI (iSCSI) and serial SCSI. In SCSI terminology, communication takes place between an initiator and a target. An initiator sends a command to a target, which responds in some manner to the command.

SCSI commands are sent in a command descriptor block (CDB) that includes a one byte operation code followed by five or more bytes that include command-specific parameters. At the end of a command sequence, a target returns a status code byte, such as 00h for success, 02h for an error, or 08h for busy. There are four categories of SCSI commands: N (non-data), W (writing data from initiator to target), R (reading data), and B (bidirectional). Among other commands, SCSI commands include: a read command, which causes data to be read from a target device; and a write command, which causes data to be written to a target device. Each device on a SCSI bus is assigned a unique SCSI identifier (ID). Devices may encompass multiple logical units that are addressed by logical unit number (LUN). Simple devices have just one LUN, more complex devices may have multiple LUNs.

BRIEF SUMMARY

A technique for operating a data storage system includes generating information that identifies data that is currently stored in a write cache of the data storage system. The information is stored in a data structure associated with the data storage system. In response to a failure of the data storage system the information in the data structure is accessed to identify the data that was lost in the failure.

The disclosed techniques may be implemented as a method, a data storage system, and/or a program product (including program code stored in a storage device).

DETAILED DESCRIPTION

Many data storage systems have implemented temporary storage (i.e., in the form of a write cache that includes random access memory (RAM)) to increase performance of a data storage system. That is, as contrasted with immediately transferring host writes to permanent storage (e.g., disks, Flash, etc.) and correspondingly tightly coupling host input/outputs (I/Os) with performance of the permanent storage, host I/Os may be acknowledged by a data storage system as soon as they are stored in a write cache of the data storage system. In this case, data in the write cache is transferred to the permanent storage at a later point-in-time. Unfortunately, even relatively high-end data storage systems may exhibit a complete hardware and/or software failure that requires the performance of sophisticated data recovery procedures to recover data that was stored in write cache and that had not yet been transferred to permanent storage.

While most data storage products may benefit from implementation of the techniques disclosed herein, the disclosed techniques may be particularly beneficial when implemented in a grid storage system. As is known, a grid storage system is a specific type of data storage that uses a series of interconnected nodes to accommodate versatile and scalable storage systems. In a grid storage system, all logical unit numbers (LUNs) are spread across all disks/flashes and regardless of which module fails in the grid there is a potential for data loss for any/all of the LUNs. In contrast, in many legacy data storage systems a given module is associated with relatively few LUNs. For example, in a typical Redundant Array of Independent Disks (RAID) data storage system, a given LUN/volume may be striped/spread across a relatively small number of disks/flashes (e.g., 5 to 8).

In the event of a data storage system failure, it is desirable identify LUNs that were affected by the failure in order to determine how to address the failure, e.g., whether data in permanent storage of the data storage system is up-to-date and valid for specific LUNs or whether the data for the specific LUNs needs to be recovered from backup storage. As used herein, the term "LUN" refers to a numeric identification that is used to identify a Small Computer System Interface (SCSI) storage device that can be accessed (read from and written to) by a host.

In general, embodiments of the present disclosure generate and permanently store information that identifies data that is currently stored in write cache (of a data storage system), such that the information is not lost in the event of a failure in the data storage system. Permanently storing information that identifies data currently stored in the write cache requires writing the information to permanent storage (e.g., a disk or a Solid State Drive (SSD)) that is not compromised if there is a software and/or hardware failure of the data storage system. It should be appreciated that the latency of host I/Os may be compromised if upon every host I/O the information that identifies the data that is currently stored in write cache is updated on the permanent storage. In this case, the write cache does not effectively serve its purpose of decoupling permanent storage performance from host I/O performance.

According to various aspects of the present disclosure, a relatively small data structure is implemented in permanent storage to identify lost data such that write amplification in a backend of a data storage system is only minimally increased. In at least one embodiment, the data structure stores information that specifies data that is stored in the write cache at any given point-in-time. In one or more embodiments, each time a data storage system writes data from a write cache to permanent storage the data storage system also updates the data structure. Since the data storage system is periodically writing data (e.g., every millisecond) from the write cache to permanent storage, the data structure is mostly up-to-date.

When a data storage system fails, a customer requires knowledge of which storage devices may be relied upon as being consistent and which storage devices may be corrupted and require restoration from backup storage. In the event of a data storage system failure, information (that specifies what data is stored in a write cache) from a data structure in permanent storage may then be used to accurately identify lost data. Information stored in a data structure may or may not be used for actual data recovery. Advantageously, the disclosed techniques provided information that it is used to identify areas that have potential data loss, i.e., LUNs that require initiation of a data recovery process that may or may not succeed in recovering the lost data. In general, the information may be communicated to a customer and used to make practical decisions regarding data loss.

In one relatively straightforward embodiment, the data structure takes the form of a bitmap data structure, with each bit in the bitmap data structure representing a LUN in the data storage system. In this embodiment, a bit is either asserted or not asserted depending on whether there is dirty data in the write cache for a given LUN. One advantage of implementing a bitmap data structure is the compactness of the data structure. However, a bitmap data structure is limited to only providing information on which LUNs were affected by data loss in the write cache and does not provide information on the amount of data that was stored in the write cache for each LUN when a data loss occurs.

According to another embodiment, a short-array data structure is implemented in which each element of the short-array data structure represents a LUN in a data storage system and a value of each element represents the amount of data (e.g., in logical pages) currently in write cache for each LUN. An approach may factor in the maximum number of LUNs in a data storage system and available space and time that can be used for hardening the data structure. According to another embodiment, a data storage system may be configured to dynamically determine, based on a current situation, how to implement a data structure for the data storage system. For example, a short-array data structure may be utilized when a data storage system implements a number of LUNS that is below a first predetermined number and a bitmap data structure may utilized when the number of LUNs exceeds a second predetermined number that may be equal to or greater than the first predetermined number.

In the event that an implemented data structure that identifies lost data only resides in a single physical device there is a risk that a data storage system failure may occur simultaneously with a failure of the physical device that implements the data structure. In this case, when a data storage system failure occurs simultaneously with the failure of the physical device a determination of what data was in the write cache is not available. To address the issue of data storage system failure occurring simultaneously with the failure of a single physical device that identifies lost data, a data structure that includes information that may be utilized to identify lost data may be cloned to multiple physical devices. It should be appreciated that implementing multiple data structures to identify lost data decreases performance of a data storage system. According to another embodiment of the present disclosure, when multiple data structures are implemented in different physical devices to identify lost data, the data structures are assigned a generation number and the data structures are updated sequentially. In this embodiment, when a data storage system failure occurs all of the multiple devices are scanned and the data structure with the latest generation number is chosen, if available, to provide information to identify the lost data. In the event that the device with the latest generation number fails a determination of what LUNs lost data may be made (with less accuracy) by using a data structure with a previous generation number.

It should be appreciated that the approaches described herein may be readily extended to data storage systems that are susceptible to losing metadata that is used to describe partitions and/or storage locations.

Figure 1A:
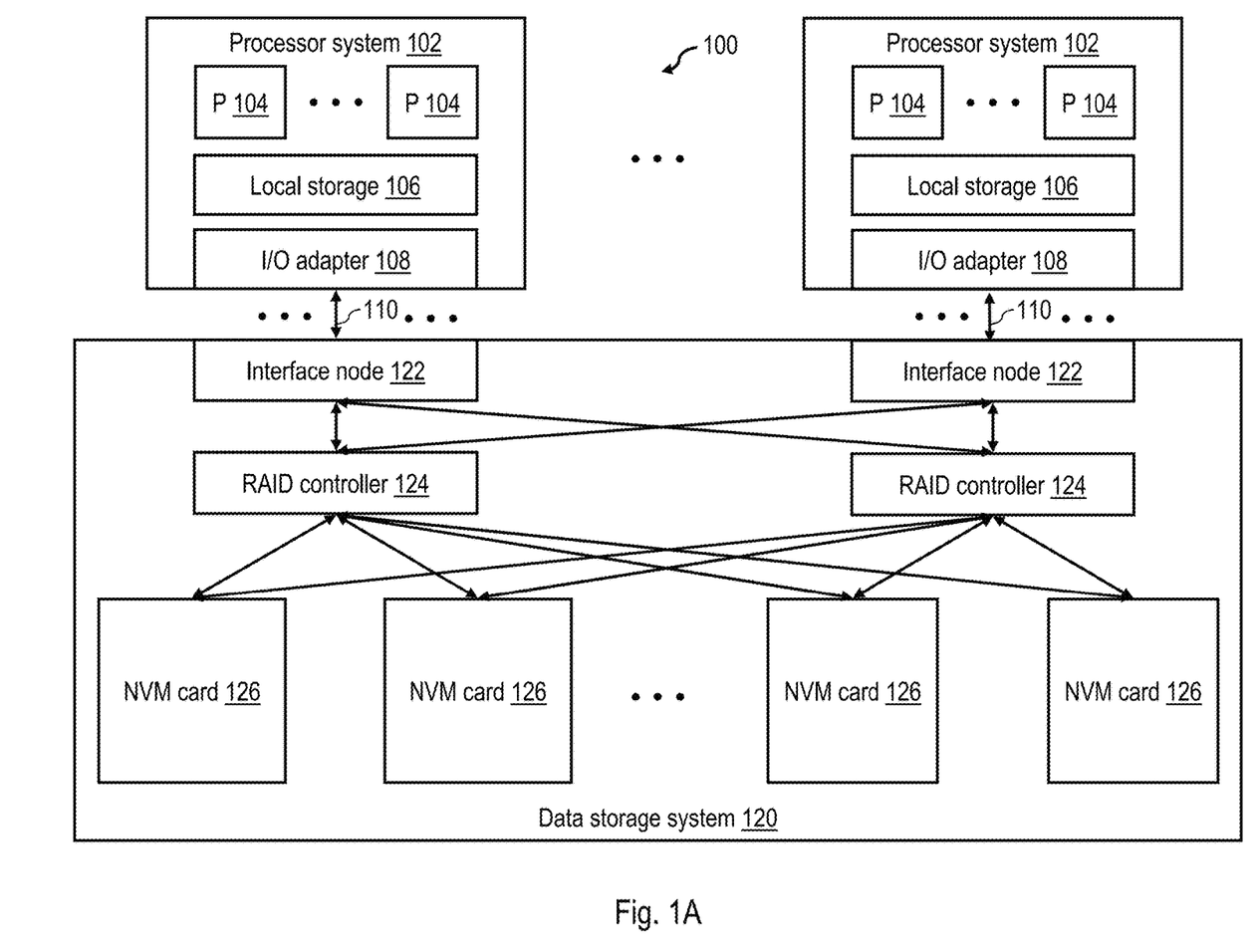
FIG. 1A is a high level block diagram of a data processing environment in accordance with one embodiment.

With reference to the figures and with particular reference to FIG. 1A, there is illustrated a high level block diagram of an exemplary data processing environment 100 including a data storage system 120 that is configured to determine the extent of data loss subsequent to a failure of data storage system 120 according to the present disclosure. As shown, data processing environment 100 includes one or more hosts, such as a processor system 102 having one or more processors 104 that process instructions and data. Processor system 102 may additionally include local storage 106 (e.g., Dynamic Random Access Memory (DRAM) or disks) that may store program code, operands and/or execution results of the processing performed by processor(s) 104. In various embodiments, processor system 102 can be, for example, a mobile calculating device (such as a smartphone or tablet), a laptop or desktop personal computer system, a server computer system (such as one of the POWER® series available from International Business Machines Corporation), or a mainframe computer system. Processor system 102 can also be an embedded processor system using various processors such as ARM®, POWER, Intel X86, or any other processor combined with memory caches, memory controllers, local storage, Input/Output (I/O) bus hubs, etc.

Each processor system 102 further includes an I/O adapter 108 that is coupled directly (i.e., without any intervening device) or indirectly (i.e., through at least one intermediate device) to a data storage system 120 via an I/O channel 110. In various embodiments, an I/O channel 110 may employ any one or a combination of known or future developed communication protocols, including, for example, Fibre Channel (FC), FC over Ethernet (FCoE), Internet Small Computer System Interface (iSCSI), InfiniBand, Transport Control Protocol/Internet Protocol (TCP/IP), Peripheral Component Interconnect Express (PCIe), Non-volatile Memory Express (NVMe), NVMe over Fabrics, etc. I/O operations (IOPs) communicated via I/O channel 110 include read IOPs by which a processor system 102 requests data from data storage system 120 and write IOPs by which a processor system 102 requests storage of data in data storage system 120.

In the illustrated embodiment, data storage system 120 includes multiple interface nodes 122 through which data storage system 120 receives and responds to IOPs via I/O channels 110. Each interface node 122 is coupled to each of multiple outer Redundant Array of Independent Disks (RAID) controllers 124 in order to facilitate fault tolerance and load balancing. Each of outer RAID controllers 124 is in turn coupled (e.g., by a PCIe bus) to each of multiple NVM cards 126 including, in this example, NVM storage media. In other embodiments, other lossy storage media can be employed.

Figure 1B:
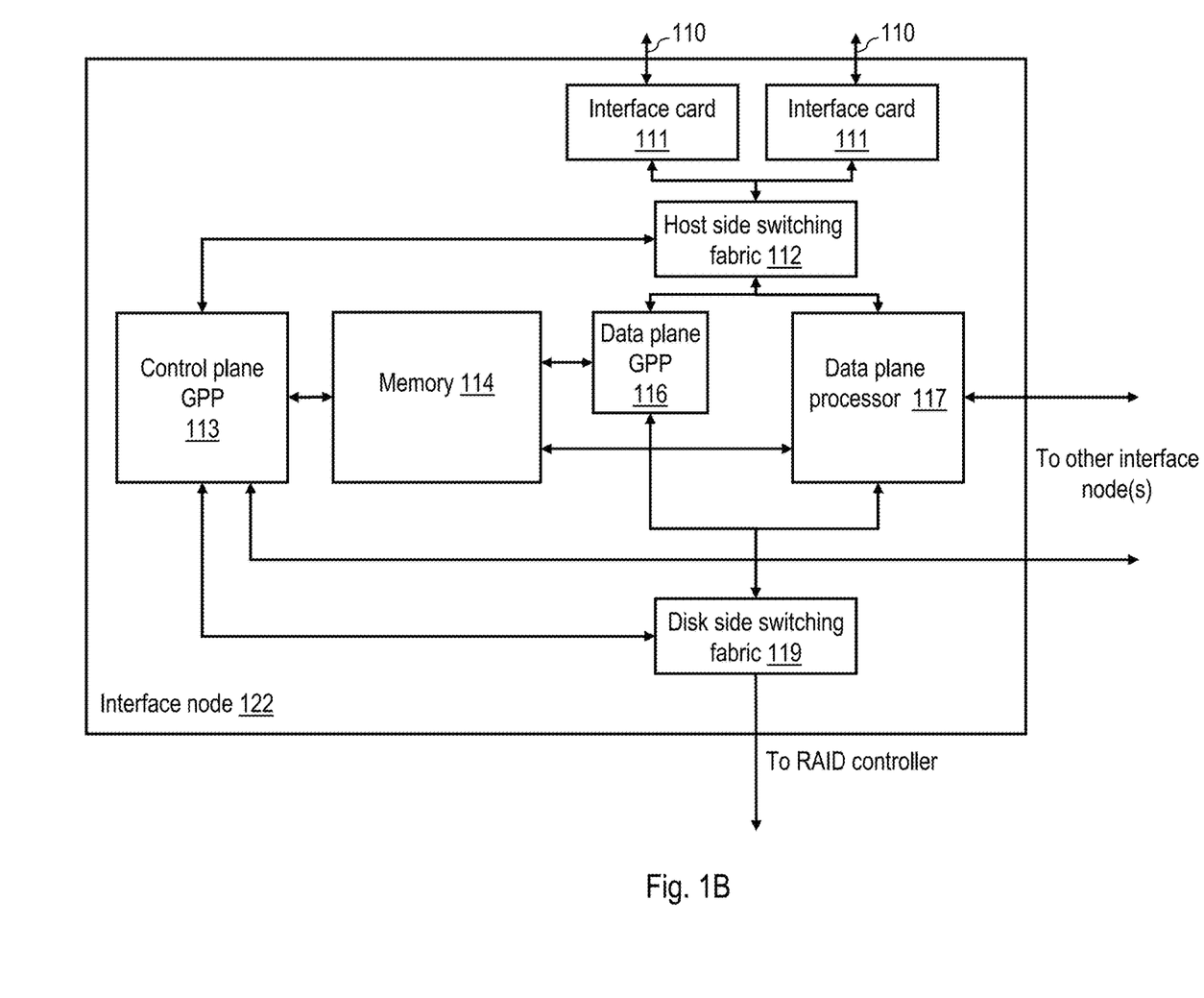
FIG. 1B is a more detailed block diagram of an exemplary interface node of a data storage system of FIG. 1A.

FIG. 1B depicts a more detailed block diagram of an interface node 122 of data storage system 120 of FIG. 1A. Interface node 122 includes one or more interface cards 111 that serve as an interface to processor systems 102 through I/O channels 110 and connect to host side switching fabric 112. The host side switching fabric 112 acts as a switch and handles all data transfers between interface cards 111 and processing units in interface node 122, namely control plane general purpose processor (GPP) 113, data plane GPP 116, and data plane processor 117. Typically, host side switching fabric 112 consist of a PCIe switch, but other switch technologies may be used as well. In one or more embodiments, data plane processor 117 is a special purpose processor that can be implemented, for example, by an Application Specific Integrated Circuit (ASIC) or a Field Programmable Gate Array (FPGA). Control plane GPP 113, data plane GPP 116, and data plane processor 117 are all connected to memory 114 which may be implemented as a shared memory between these components, separate memories, or a combination thereof.

In embodiments in which data plane processor 117 is implemented with an FPGA, control plane GPP 113 may program and configure data plane processor 117 during start-up of data storage system 120. Data plane GPP 116 and control plane GPP 113 control data plane processor 117 as well as access to NVM cards 126 either indirectly through the control of data plane processor 117 or directly through disk side switching fabric 119. Control plane GPP 113 executes system management functions as well as higher level services such as snapshots, thin provisioning, and deduplication. Data plane GPP 116 executes protocol specific functions. Control plane GPP 113, data plane GPP 116, and data plane processor 117 are connected to outer RAID controller 124 through disk side switching fabric 119 which typically consist of a PCIe switch, but other switch technologies may be used as well. FIG. 1B further illustrates control plane GPP 113 and data plane processor 117 being connected to other interface nodes 122 in data storage system 120 to handle fail-over scenarios or for performing other data synchronization functions.

Figure 1C:
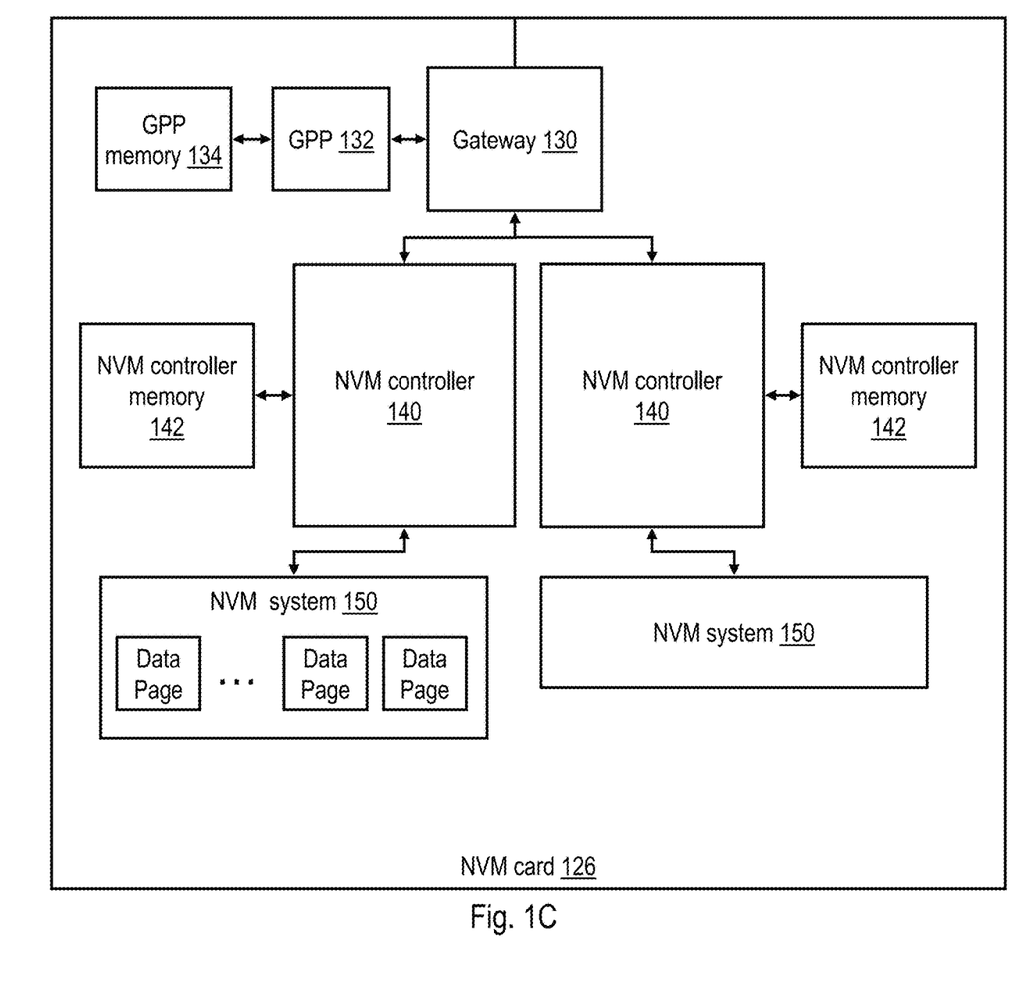
FIG. 1C is a more detailed block diagram of an exemplary non-volatile memory (NVM) card of the data storage system of FIG. 1A.

FIG. 1C depicts a more detailed block diagram of an NVM card 126 of data storage system 120 of FIG. 1A. NVM card 126 includes a gateway 130 that serves as an interface between NVM card 126 and outer RAID controllers 124. Gateway 130 is coupled to a general-purpose processor (GPP) 132, which can be configured (e.g., by program code) to perform various management functions, such as pre-processing of IOPs received by gateway 130 and/or to schedule servicing of the IOPs by NVM card 126. GPP 132 is coupled to a GPP memory 134 (e.g., Dynamic Random Access Memory (DRAM) or Magneto-resistive Random Access Memory (MRAM)) that can conveniently buffer data created, referenced, and/or modified by GPP 132 in the course of its processing.

Gateway 130 is further coupled to multiple NVM controllers 140, each of which controls a respective NVM system 150. The NVM controllers 140 may implement combined ECC/RAID data protection techniques for a NVM array. NVM controllers 140 can be implemented, for example, by an Application Specific Integrated Circuit (ASIC) or a Field Programmable Gate Array (FPGA) having an associated NVM controller memory 142 (e.g., DRAM). In embodiments in which NVM controllers 140 are implemented with an FPGA, GPP 132 may program and configure NVM controllers 140 during start-up of data storage system 120. After startup, in general operation NVM controllers 140 receive read and write IOPs from gateway 130 that request to read data stored in NVM system 150 and/or to store data in NVM system 150. NVM controllers 140 service these IOPs, for example, by accessing NVM systems 150 to read or write the requested data from or into NVM systems 150 or by accessing one or more read and/or write caches (not illustrated in FIG. 1C) associated with NVM systems 150.

NVM controllers 140 implement a translation layer that provides logical-to-physical address translation to enable access to specific memory locations within NVM systems 150. In general, an IOP received by NVM controller 140 from a host device, such as a processor system 102, contains the logical block address (LBA) at which the data is to be accessed (read or written) and, if a write IOP, the write data to be written to data storage system 120. The IOP may also specify the amount (or size) of the data to be accessed. Other information may also be communicated depending on the protocol and features supported by data storage system 120. The LBA provided by the host device corresponds to a logical page within a logical address space, the logical page typically having a size in the range between 512 bytes to four (4) kilobytes or more. The translation layer translates this LBA into a physical address assigned to a corresponding physical location in a NVM system 150.

NVM controllers 140 may perform address translation and/or store mappings between logical and physical addresses in a logical-to-physical translation data structure, such as a logical-to-physical translation (LPT) table, which may conveniently be stored in NVM controller memory 142. An LPT table may also be configured to store compressed page sizes of data pages stored in NVM system 150 and even further their CRC values.

Having described the general physical structure and operation of one exemplary embodiment of a data storage system 120, certain operational aspects of data storage system 120 are now described with reference to FIG. 2, which is a high level flow diagram of the flash management functions and data structures employed by GPP 132 and/or NVM controllers 140 in accordance with one embodiment.

As noted above, data storage system 120 does not generally allow external devices to directly address and/or access the physical memory locations within NVM systems 150. Instead, data storage system 120 is generally configured to present a single contiguous logical address space to the external devices, thus allowing host devices to read and write data to and from LBAs within the logical address space while permitting NVM controllers 140 and GPP 132 to control where the data that is associated with the various LBAs actually resides in the physical memory locations comprising NVM systems 150. In this manner, performance and longevity of NVM systems 150 can be intelligently managed and optimized. In the illustrated embodiment, each NVM controller 140 manages the logical-to-physical translation using a logical-to-physical translation data structure, such as logical-to-physical translation (LPT) table 200, which can be stored in the associated flash controller memory 142. An LPT table, such as LPT table 200, can also be configured to store compressed page sizes of data pages stored in NVM systems 150 and/or other metadata to aid in data deduplication.

Flash management code running on the GPP 132 tracks erased blocks of NVM system 150 that are ready to be used in ready-to-use (RTU) queues 206, which may be stored, for example, in GPP memory 134. In the depicted embodiment, management code running on the GPP 132 preferably maintains one or more RTU queues 206 per channel, and an identifier of each erased block that is to be reused is enqueued in one of RTU queues 206 corresponding to its channel. For example, in one embodiment, RTU queues 206 include, for each channel, a respective RTU queue 206 for each of a plurality of block health grades. In various implementations, between 2 and 8 RTU queues 206 per lane (and a corresponding number of block health grades) have been found to be sufficient.

A build block stripes function 220 performed by flash management code running on GPP 132 may be implemented to construct new block stripes for storing data and associated parity information from the erased blocks enqueued in RTU queues 206. Block stripes are preferably formed of blocks of the same or similar health (i.e., expected remaining useful life) residing in different channels, meaning that build block stripes function 220 can conveniently construct a block stripe by drawing each block of the new block stripe from corresponding RTU queues 206 of different channels. The new block stripe is then queued to NVM controller 140 for data placement.

In response to a write IOP received from a host, such as a processor system 102, a data placement function 210 of NVM controller 140 determines by reference to LPT table 200 whether the target LBA(s) indicated in the write request is/are currently mapped to physical memory page(s) in NVM system 150 and, if so, changes the status of each data page currently associated with a target LBA to indicate that it is no longer valid. In addition, data placement function 210 allocates a page stripe if necessary to store the write data of the write IOP and any non-updated data (i.e., in case the write request is smaller than a logical page, there is still valid data which needs to be handled in a read-modify-write manner) from an existing page stripe, if any, targeted by the write IOP, and/or stores the write data of the write IOP and any non-updated (i.e., still valid) data from an existing page stripe, if any, targeted by the write IOP to an already allocated page stripe which has free space left. The page stripe may be allocated from either a block stripe already allocated to hold data or from a new block stripe built by build block stripes function 220. In one embodiment, the page stripe allocation can be based on the health of the blocks available for allocation and the "heat" (i.e., estimated or measured write access frequency) of the LBA of the write data. Data placement function 210 then writes the write data, associated metadata (e.g., CRC and ECC values), for each codeword in each page of the page stripe, and parity information for the page stripe in the allocated page stripe. The associated metadata and parity information can be written to storage as soon as enough host data has been placed into the page stripe. NVM controller 140 also updates LPT table 200 to associate the physical page(s) utilized to store the write data with the LBA(s) indicated by the host device. Thereafter, NVM controller 140 can access the data to service host read IOPs by reference to LPT table 200 as further illustrated in FIG. 2.

Once all pages in a block stripe have been written, NVM controller 140 places the block stripe into one of occupied block queues 202, which flash management code running on GPP 132 utilizes to facilitate garbage collection. As noted above, through the write process, pages are invalidated, and therefore portions of NVM 150 become unused. An associated NVM controller 140 (and/or GPP 132) eventually needs to reclaim this space through garbage collection performed by a garbage collector 212. Garbage collector 212 selects particular block stripes for garbage collection based on a number of factors including, for example, the health of the blocks within the block stripes and how much of the data within the erase blocks is invalid. In the illustrated example, garbage collection is performed on entire block stripes, and flash management code running on GPP 132 logs the block stripes ready to be recycled in a relocation queue 204, which can conveniently be implemented in the associated flash controller memory 142 or GPP memory 134.

The NVM management functions performed by GPP 132 or NVM controller 140 additionally include a relocation function 214 that relocates the still valid data held in block stripes enqueued in relocation queue 204. To relocate such data, relocation function 214 issues relocation write requests to data placement function 210 to request that the data of the old block stripe be written to a new block stripe in NVM system 150. In addition, relocation function 214 updates LPT table 200 to remove the current association between the logical and physical addresses of the data and to replace it with the new association. Once all still valid data has been moved from the old block stripe, the old block stripe is passed to dissolve block stripes function 216, which decomposes the old block stripe into its constituent blocks, thus disassociating the blocks. NVM controller 140 then erases each of the blocks formerly forming the dissolved block stripe and increments an associated program/erase (PE) cycle count for the block in PE cycle counts 244. Based on the health metrics of each erased block, each erased block is either retired (i.e., no longer used to store user data) by a block retirement function 218 among the flash management functions executed on GPP 132, or alternatively, prepared for reuse by placing the block's identifier on an appropriate ready-to-use (RTU) queue 206 in associated GPP memory 134.

Figure 2:
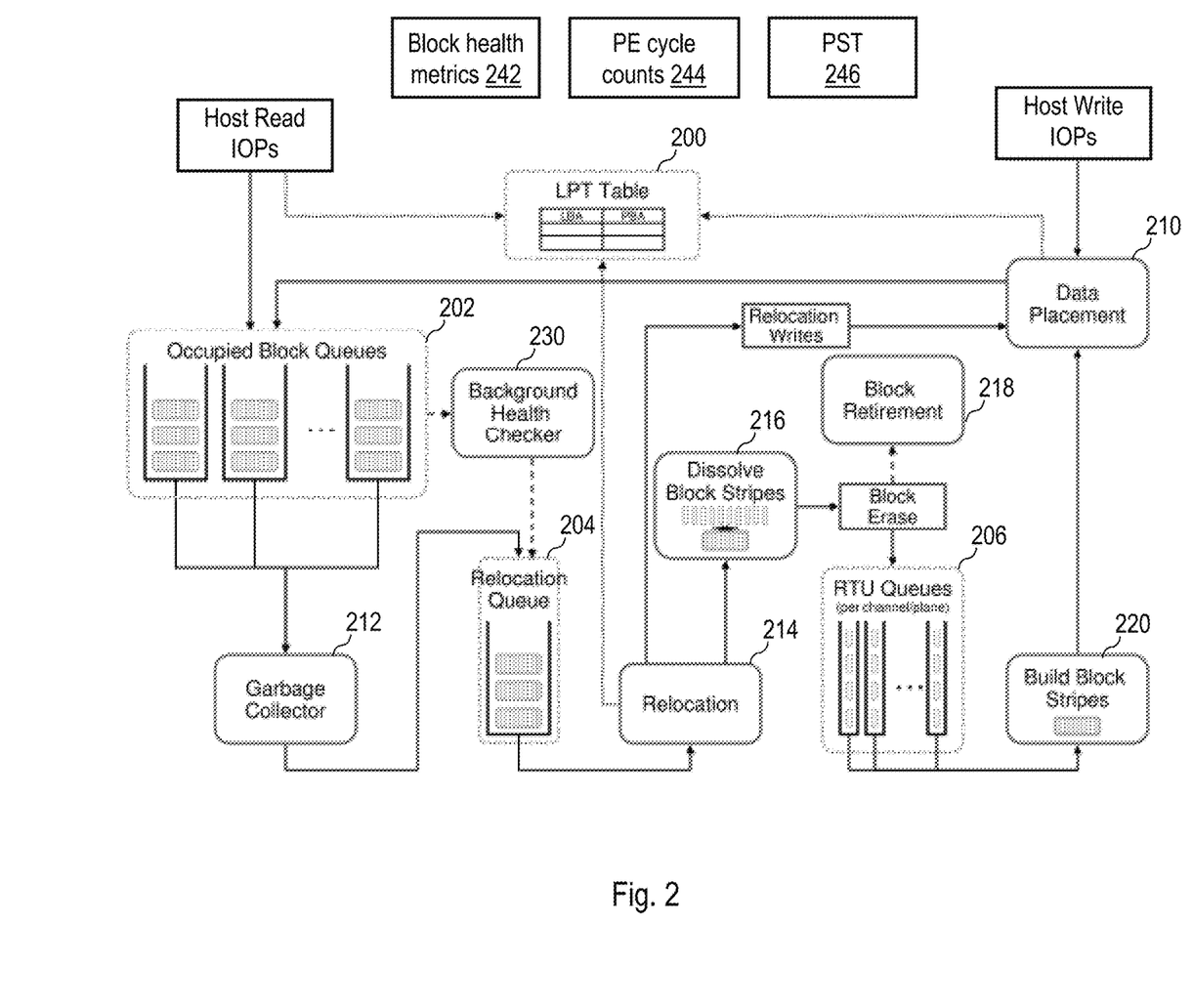
FIG. 2 is a high level flow diagram of the Flash management functions and data structures employed by an NVM controller in accordance with one embodiment.

As further shown in FIG. 2, NVM management functions executed on GPP 132 include a Background Health Checker (BGHC) 230. BGHC 230, which operates independently of the demand read and write IOPs of hosts such as processor systems 102, continuously determines one or more block health metrics 242 for blocks belonging to block stripes recorded in occupied block queues 202. Based on the one or more of block health metrics 242, BGHC 230 may place block stripes on relocation queue 204 for handling by relocation function 214.

Figure 3:
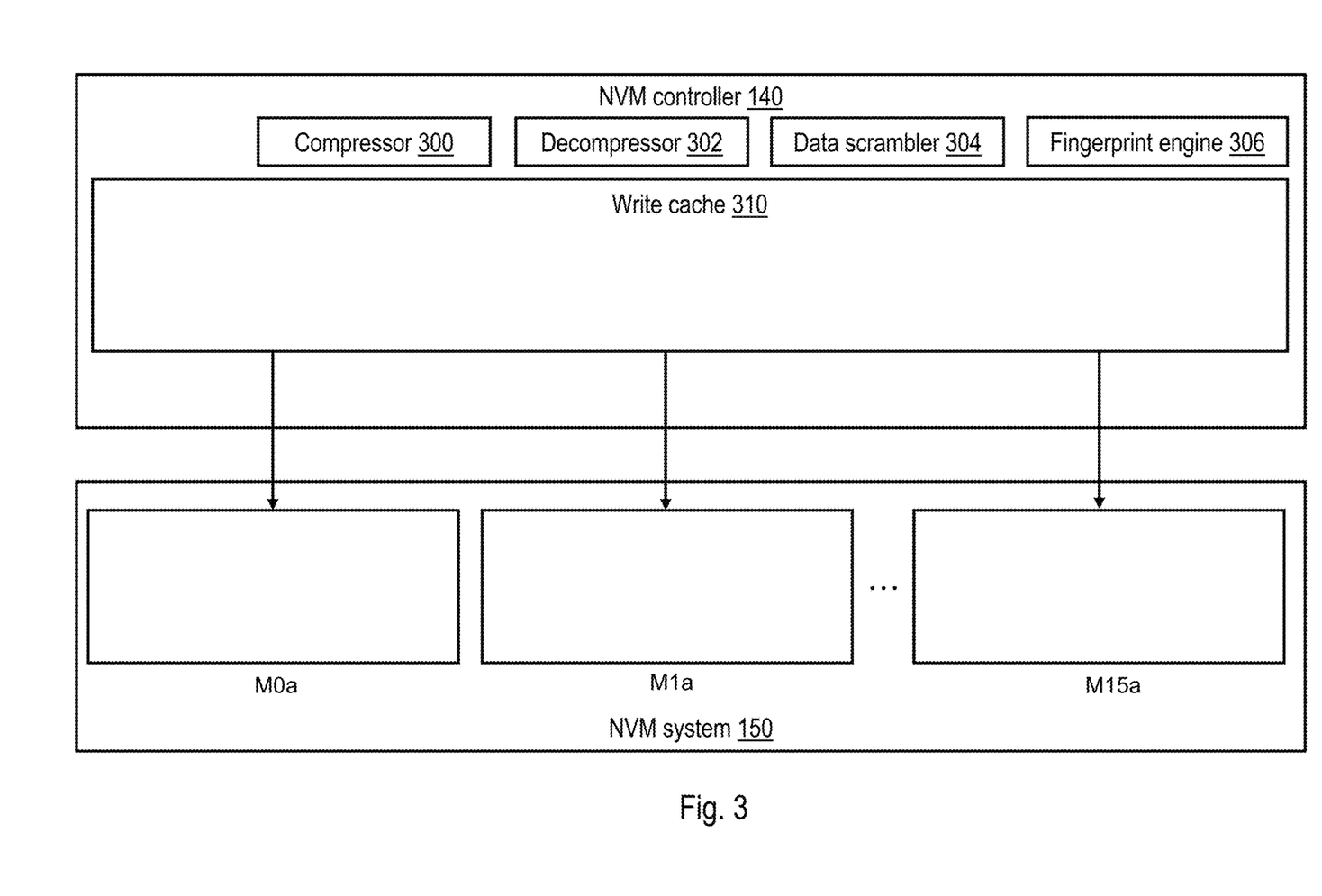
FIG. 3 depicts a view of an exemplary NVM controller and an exemplary NVM system of FIG. 1C.

NVM systems 150 may take many forms in various embodiments. Referring now to FIG. 3, there is depicted one exemplary arrangement of physical memory within a NVM system 150 in accordance with one exemplary embodiment.

NVM system 150 may be formed from thirty-two (32) individually addressable NVM storage devices, which will be referred to as packages. In the illustrated example, each of the NVM storage devices M0a-M15b takes the form of a board-mounted NVM module capable of storing one, two or more bits per cell. Thus, NVM modules may be implemented with Single Level Cell (SLC), Multi-Level Cell (MLC), Three Level Cell (TLC), Quad Level Cell (QLC) memory, or another type of NVM. The thirty-two NVM modules are arranged in sixteen groups of two, (M0a, M0b) through (M15a, M15b). For purposes of the physical addressing scheme, each group of two modules forms a "lane," also sometimes referred to as a "channel," such that NVM system 150 includes sixteen channels or lanes (Lane0-Lane15).

In one embodiment, each of the individual lanes has a respective associated bus coupling it to the associated NVM controller 140. Thus, by directing its communications to one of the specific communication buses, NVM controller 140 can direct its communications to one of the lanes of memory modules. Because each communication bus for a given lane is independent of the communication buses for the other lanes, a NVM controller 140 can issue commands and send or receive data across the various communication buses at the same time, enabling the NVM controller 140 to access the NVM modules corresponding to the individual lanes at, or very nearly at, the same time.

In the illustrated embodiment, NVM controller 140 includes a compressor 300 that selectively applies one or more data compression algorithms to data written to the associated NVM system 150, a decompressor 302 that decompresses compressed data read from NVM system 150, and a data scrambler 304. NVM controller 140 utilizes data scrambler 304 to apply a predetermined data scrambling (i.e., randomization) pattern to data written to NVM system 150 in order to improve endurance.

As further illustrated in FIG. 3, NVM controller 140 includes a write cache 310. Write cache 310 includes storage for one or more cache lines for buffering write data in anticipation of writing the data to NVM system 150.

Conventional data storage system architectures (including Storage Area Network (SAN) and Network Attached Storage (NAS) solutions) have typically relied on a centralized storage controller that receives and distributes Input/Output (I/O) requests across an array of storage devices (e.g., Hard Disk Drives (HDDs), SSDs, Flash Card Modules (FCMs)). In a conventional data storage system, a storage controller has been configured to distribute data across an array of storage devices utilizing a data protection technology (e.g., a Redundant Array of Independent Disks (RAID) technology) so that the storage system can withstand the failure of at least one of the storage devices. In a conventional storage system, a storage controller has also been configured to transparently reconstruct lost data in the event of a storage device failure. Conventional storage system architectures, however, have limitations that become problematic when solid state storage devices, that are capable of much higher data rates than hard disk drives, are implemented.

Conventional data storage system architectures have typically protected data against sector errors and failures of whole physical drives by using RAID technologies, implemented by a RAID engine (e.g., located in a RAID controller). In one or more data storage system architectures, a RAID engine has been implemented in a storage controller to organize data into stripes that span a set of storage devices. Each stripe spans 'n' storage devices and includes 'n' minus 'p' data strips and 'p' parity strips (e.g., for RAID 5, p=1; and for RAID 6, p=2). In conventional data storage system architectures, data and parity strips have typically been the same size (i.e., a size of data and parity strips has been defined by a size of a stripe and a number of storage devices used for the stripe) and each of the data and parity strips has been stored on a different storage device.

Parity information, which has been computed using various techniques (e.g., exclusive OR (XOR) operations, addition and multiplication in a particular Galois field, or Reed-Solomon error correction), has typically been significantly less compressible than actual data. In data storage architectures that perform compression above a RAID engine, the compression operation has usually resulted in a performance bottleneck that limits read and write bandwidth and increases latency. In an attempt to reduce parity update overhead in the presence of non-sequential small writes, at least some storage architectures that have performed compression above a RAID engine have also organized data into a Log-Structured Array (LSA) prior to compressing the data. However, organizing data into an LSA introduces additional complexity in a storage system and does not mitigate the performance bottleneck that results from performing compression above a RAID engine.

In general, Flash-based SSDs benefit from sequential write patterns, such as write patterns produced by LSA data organization (in which user data is packed into logical segments appended to a global log structure that may span multiple devices). With LSA data organization, as user write operations enter a storage system, data associated with the write operations are packed into relatively large segments. In a typical implementation, each segment is a multiple of a logical erase block (LEB) size of an underlying storage device. When a segment is full, the segment is de-staged to an SSD as a single sequential write operation. It should be appreciated that packing logical data into segments requires remapping of logical data pages to physical storage locations.

As one example, a mapping table (e.g., a Logical-to-Physical Translation (LPT) table) may be implemented to keep track of which physical location corresponds to a given logical address. For example, a unit of user reads and writes may correspond to a logical page with a 4 kB size. In the case of a 4 kB logical page, when a user updates a previously stored page new data is appended to a currently open segment, i.e., at a first free 4 kB page within the segment, and an LPT table entry for the logical page is updated to point to the new physical location. In this case, the old version of the logical page (which had been stored in some other segment) is rendered invalid. When a user wants to read a stored logical page, the LPT table is accessed to locate a current physical location where the data is stored. In a typical implementation, the LPT table is stored in Dynamic Random Access Memory (DRAM) for relatively fast access.

It should be noted that the implementation of an LSA above a RAID controller 124 or below in storage devices, such as NVM cards 126, entail separate LPTs and the granularity at which the mappings are maintained may differ. For example, an LPT above RAID controller 124 may address logical pages at 32 kb and an LPT in a storage device at 4 kB. Also, the terms logical and physical must be seen in the correct context. In an LSA above RAID controller 124, a logical page relates to an array-level logical page whereas the physical page relates to a logical page on the storage device level which usually does not correspond to a physical NAND flash page. In an LSA implemented in a storage device, the logical page corresponds to a card-level logical page and a physical page to an actual physical NAND flash page. In order to simplify the notation, the term logical-to-physical is used here independent of the actual location of the LSA.

As previously mentioned, in data storage systems that have implemented a write cache to increase performance of a data storage system, in the event of a hardware and/or software failure sophisticated data recovery procedures may be required to recover data that was stored in write cache and that had not yet been transferred to permanent storage. In general, those data recovery procedures require information on what LUN(s) lost data.

Figure 4:
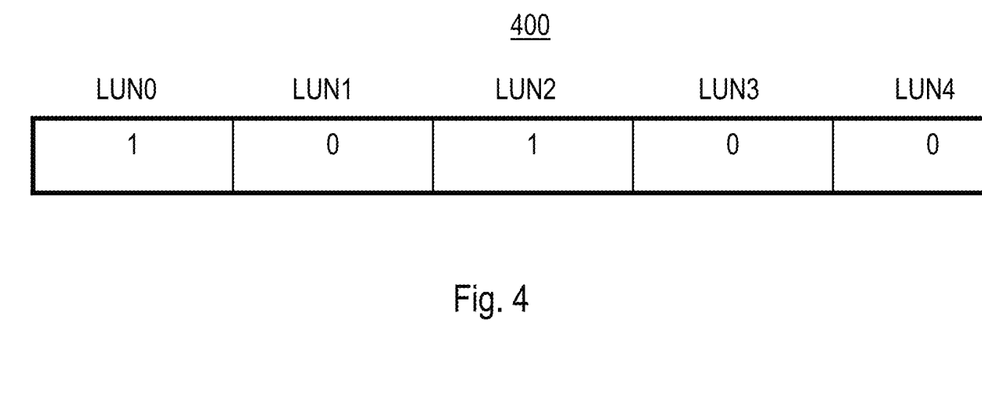
FIG. 4 is a diagram of an exemplary bitmap data structure according to an embodiment of the present disclosure.

With reference to FIG. 4, a bitmap data structure 400 is depicted as having five entries, with each entry corresponding to a respective LUN and whose one bit value indicates whether data for a respective LUN was stored in a write cache 310 when a failure of data storage system 120 occurred. As is illustrated by entries for LUN0 and LUN2 being asserted and assuming a failure in data storage system 120, LUN0 and LUN2 had data in write cache 310 at the time of the failure of data storage system 120. As is illustrated by entries for LUN1, LUN3, and LUN4 not being asserted, LUN1, LUN3, and LUN4 did not have data in write cache 310 at the time of the failure of data storage system 120. As such, only data for LUN0 and LUN2 needs to be recovered. However, the amount of data to recover for LUN0 and LUN2 is not ascertainable from bitmap data structure 400. While bitmap data structure 400 is illustrated with five entries, it should be appreciated that a bitmap data structure may be configured according to the present disclosure to include more or less than five entries. As one example, data structure 400 may be located in an NVM system 150 of an NVM card 126.

Figure 5:
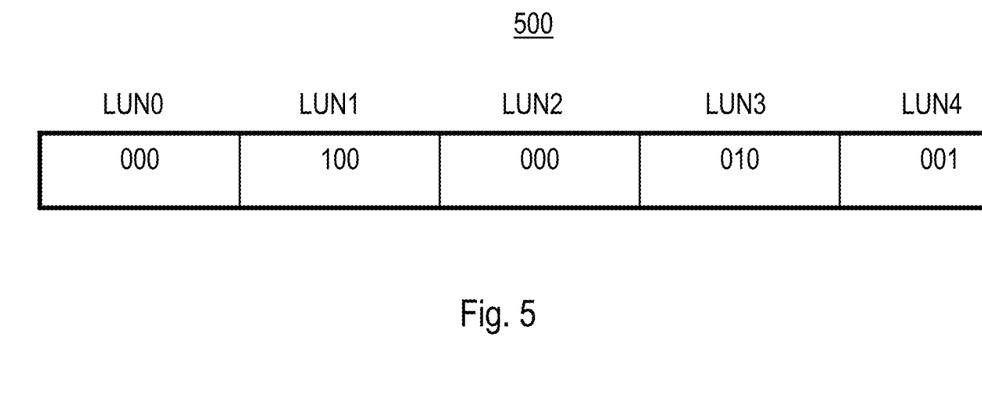
FIG. 5 is a diagram of an exemplary short-array data structure according to another embodiment of the present disclosure.

With reference to FIG. 5, a short-array data structure 500 is depicted as having five elements, with each element corresponding to a respective LUN and whose three bit value indicates how many units of data (e.g., logical pages) for a respective LUN are stored in write cache 310. As is illustrated by elements for LUN0 and LUN2 being zero and assuming a failure of data storage system 120, LUN0 and LUN2 had no units of data in write cache 310 at the time of the failure of data storage system 120. As is illustrated by elements for LUN1, LUN3, and LUN4 not being zero, LUN1, LUN3, and LUN4 had 4, 2, and 1 units (e.g., logical pages) of data, respectively, in write cache 310 at the time of the failure of data storage system 120. As such, only the specified amount of data for LUN1, LUN3, and LUN4 needs to be recovered. While short-array data structure 500 is illustrated with five elements each having three bits, it should be appreciated that a short-array data structure may be configured according to the present disclosure to include more or less than five elements each having two or more bits. As one example, data structure 500 may be located in an NVM system 150 of an NVM card 126.

Figure 6:
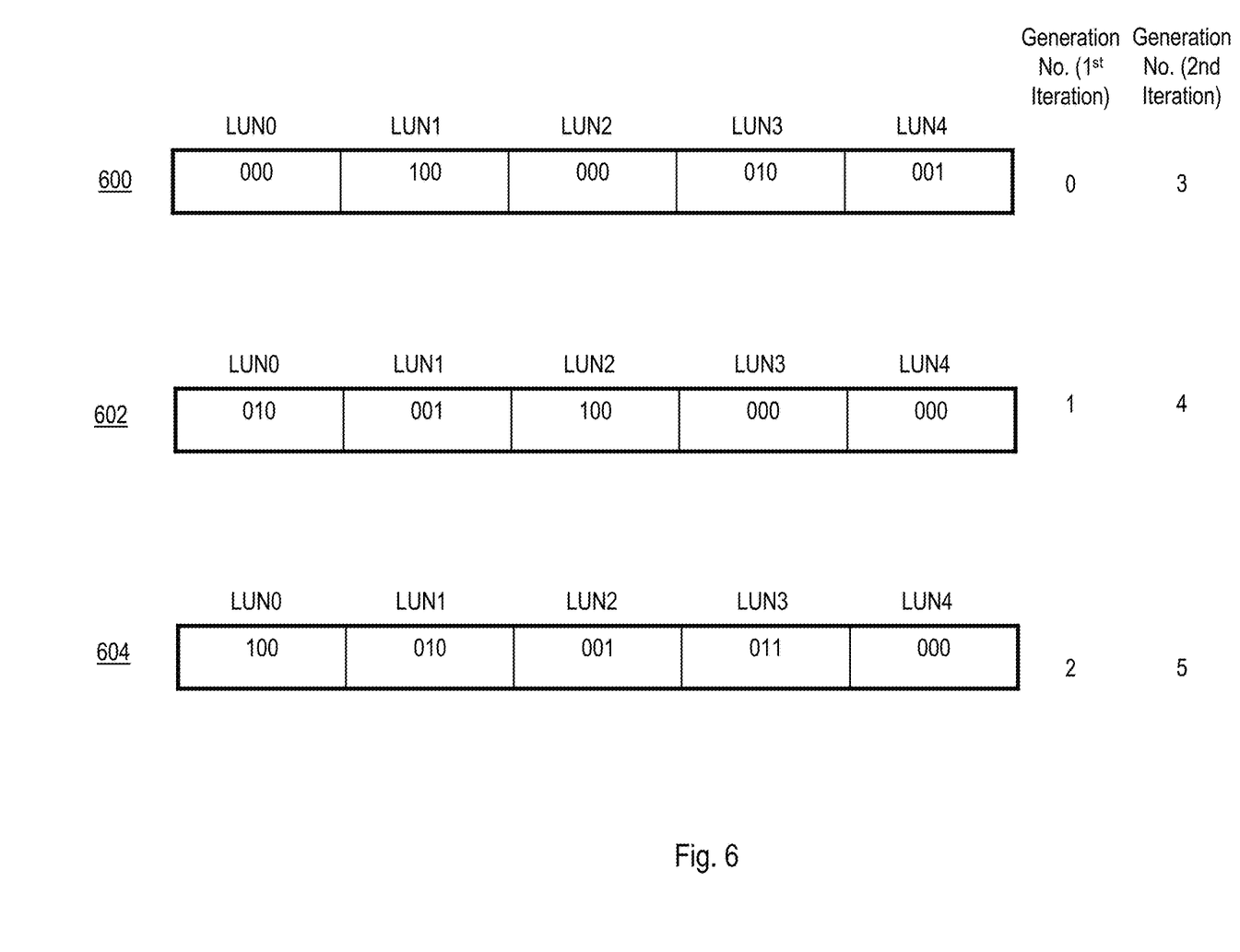
FIG. 6 is a diagram of three exemplary short-array data structures according to an embodiment of the present disclosure.

With reference to FIG. 6, three short-array data structures 600, 602, and 604 are depicted that each have five elements, with each element corresponding to a respective LUN and whose three bit value indicates an amount of data (e.g., in pages) for a respective LUN that is currently stored in write cache 310. According to the present disclosure, each of data structures 600, 602, and 604 are maintained in separate physical devices (to prevent the loss of all data loss information in the event that some of the respective devices fail) and are sequentially updated as specified by respective generation numbers.

It should be appreciated that at the end of a first iteration data structure 604 has the latest information (as it has the highest generation number, i.e., '2') and can be utilized subsequent to a failure of data storage system 120 in the event an associated physical device has not also failed. In the event that data structure 604 is not available, data structure 602 can be utilized subsequent to a failure of data storage system 120 in the event an associated physical device has not also failed. In the event that data structures 604 and 602 are not available, data structure 600 can be utilized subsequent to a failure of data storage system 120 in the event an associated physical device has not also failed. As illustrated, at the end of a second iteration data structure 604 has the latest information (as it has the highest generation number, i.e., '5') and can be utilized subsequent to a failure of data storage system 120 in the event an associated physical device has not also failed. As one example, data structures 600, 602, and 604 may be located in different NVM systems 150 of a same NVM card 126 or may be located in different NVM cards 126 of data storage systems 120.

While short-array data structure 600, 602, and 604 are each illustrated with five elements each having three bits, it should be appreciated that short-array data structures may be configured according to the present disclosure to include more or less than five entries each having two or more bits.

Figure 7:
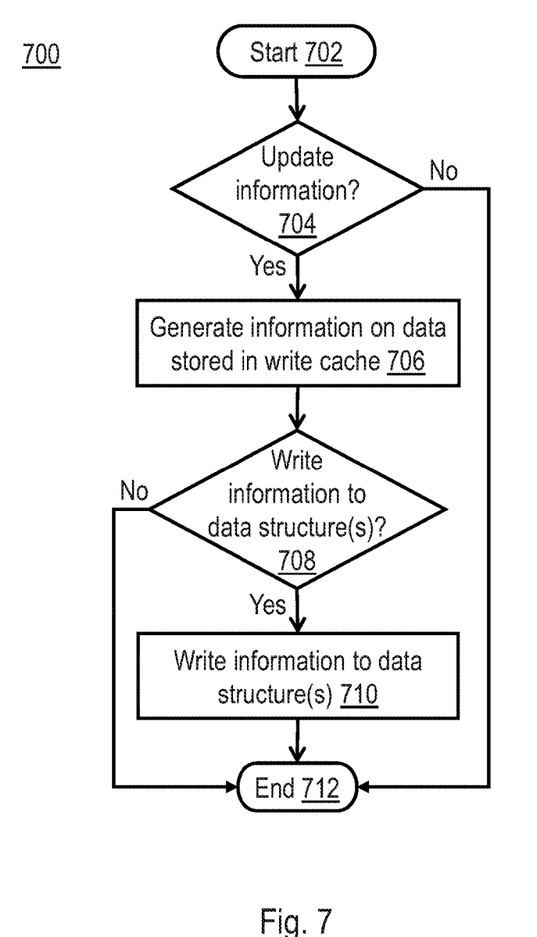
FIG. 7 is a high level logical flowchart of an exemplary process for determining the extent of data loss as a result of a data storage system failure in accordance with an embodiment of the present disclosure.

With reference to FIG. 7, an exemplary process 700 is illustrated that determines information regarding the extent of data loss as a result of a data storage system failure and stores the information in a data structure, according to the present disclosure. The data structure may take the form of a bitmap data structure 400 (see FIG. 4), a short-array data structure 500 (see FIG. 5), a group of bitmap data structures, or a group of short-array data structures (see FIG. 6). It should be appreciated that process 700 may be simultaneously performed by multiple controllers (e.g., NVM controllers 140 of allocated NVM cards 126) of data storage system 120. Process 700 may be initiated in block 702, for example, when NVM controller 140 receives a communication. Next, in decision block 704, NVM controller 140 determines whether it is time to update information about the data (e.g., including which LUNs currently have data in write cache 310 and the amount of data for each of the LUNs) currently stored in write cache 310. In response to NVM controller 140 determining that it is not time to update information about data currently stored in write cache 310 control transfers to block 712, where process 700 terminates and control returns to a calling process. For example, NVM controller 140 may be configured to update information about the data when write cache 310 stores a specific number of new logical pages of data.

In response to NVM controller 140 determining that it is time to update information about the data currently stored in write cache 310 control transfers from block 704 to block 706. In block 706, NVM controller 140 updates the information about data currently stored in write cache 310. It should be appreciated that the information may be stored with data in write cache 310 or in another temporary storage. Next, in decision 708, NVM controller 140 determines whether it is time to write the updated information about the data stored in write cache 310 to data structure(s) in permanent storage (e.g., NVM systems 150). As one example, information may be written to the permanent storage when it is time to write data from write cache 310 to NVM system 150. In response to NVM controller 140 determining that it is not time to write the updated information about the data stored in write cache 310 to data structure(s) in permanent storage control transfers to block 712. In response to NVM controller 140 determining that it is time to write the updated information about the data stored in write cache 310 to data structure(s) in permanent storage control transfers from block 708 to block 710.

In block 710 NVM controller 140 writes the updated information to a data structure in permanent storage. It should be appreciated that the data structure may always be the same data structure or may correspond to a one of a group of cloned data structures that are each located on different physical devices. As one example, a first data structure may be implemented on a first physical device and a second data structure may be implemented on a second physical device. In this case, the updated information is written to the first data structure on a first update, to the second data structure on a second update, to the first data structure on a third update, and so on. Following block 710 control transfers to block 712.

Figure 8:
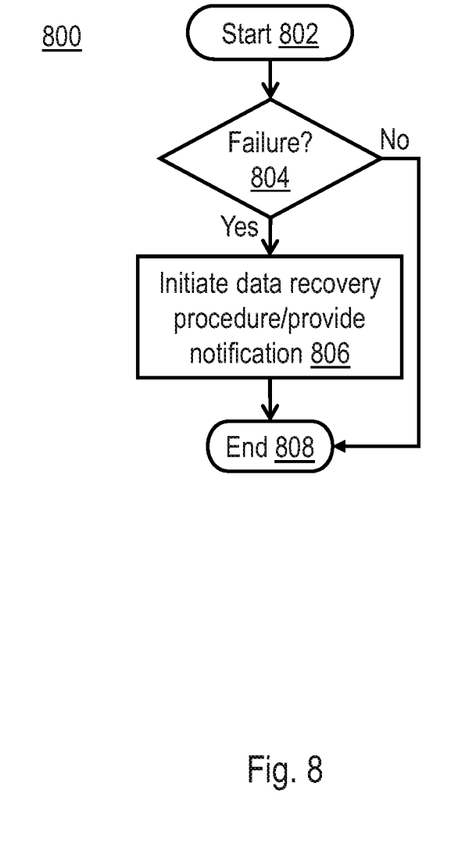
FIG. 8 is a high level logical flowchart of an exemplary process for recovering data or providing a notification based on information that details the extent of data loss as a result of a data storage system failure in accordance with an embodiment of the present disclosure.

With reference to FIG. 8, an exemplary process 800 is illustrated that determines whether a data recovery process should be initiated (e.g., following a reboot of data storage system 120). It should be appreciated that process 800 may be simultaneously performed by multiple controllers (e.g., NVM controllers 140 of allocated NVM cards 126) of data storage system 120. Process 800 may be initiated in block 802, for example, when NVM controller 140 is powered down and then powered up. Next, in decision block 804, NVM controller 140 determines whether a failure in data storage system 120 has occurred that has caused data in write cache 310 to be lost. In response to NVM controller 140 determining a failure in data storage system 120 has not occurred that has caused data in write cache 310 to be lost in block 804 control transfers to block 808, where process 800 terminates and control returns to a calling process. In response to NVM controller 140 determining a failure in data storage system 120 has occurred in block 804 that has caused data in write cache 310 to be lost control transfers to block 806. In block 806 NVM controller 140 initiates a data recovery procedure utilizing the information stored in a data structure (or when multiple data structures are implemented a last updated data structure that is available). Alternatively (or in addition to), in block 806, NVM controller 140 may provide a notification that identifies lost data utilizing the information. Following block 806 control transfers to block 808.

Advantageously, the disclosed techniques facilitate data recovery by determining the extent of data loss as a result of a data storage system failure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a NVM controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude transmission media per se, transitory propagating signals per se, and forms of energy per se.

In addition, although embodiments have been described that include use of an NVM such as a phase change memory (PCM), it should be appreciated that embodiments of the present invention can also be used with other types of non-volatile random access memory (NVRAM) including, for example, flash memory, as well as traditional rotational hard drives (HDDs), shingled magnetic recording hard disk drives (SMR HDDs) and combinations thereof.

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method of operating a data storage system including a non-volatile storage device and write cache that temporarily buffers data to be written from the write cache into the non-volatile storage device, the method comprising:

generating, by a controller, information that identifies data that is currently stored in the write cache of the data storage system;

storing, by the controller in a data structure associated with the data storage system and separate from the write cache, the information that identifies the data stored in the write cache but not the data itself; and based on detecting a failure of the data storage system that causes the data in the write cache to be lost, accessing, by the controller, the information in the data structure and, based on the information accessed from the data structure, identifying the data stored in the write cache that was lost as a result of the failure.

2. The method of claim 1, wherein the data structure is a bitmap data structure in which each of a plurality of bits indicates whether or not a respective one of multiple logical unit numbers (LUNs) associated with the data storage system has lost data.

3. The method of claim 1, wherein the data structure is a short-array data structure whose configuration specifies an amount of data lost within logical unit numbers (LUNs) associated with the data storage system.

4. The method of claim 1, and further comprising updating, by the data storage system, the data structure each time the data storage system writes data from the write cache to the non-volatile storage device.

5. The method of claim 1, and further comprising dynamically determining, by the data storage system based on a current situation, which of multiple different data structure configurations is utilized to implement the data structure.

6. The method of claim 5, wherein the determining includes determining to implement the data structure as a short-array data structure when logical unit numbers (LUNs) associated with the data storage system are below a first predetermined number and determining to implement the data structure as a bitmap data structure when the number of LUNs exceeds a second predetermined number.

7. The method of claim 1, wherein:
the data structure is a first data structure; and
the method further comprises:
cloning the first data structure to at least a second data structure stored on a different physical device than the first data structure;
assigning differing first and second generation numbers to the first and second data structures, respectively; and
updating only one of the first and second data structure based on a given update to the write cache.

8. A data storage system, comprising:
a non-volatile memory (NVM) array;
a write cache coupled to the NVM array; and
a controller coupled to the NVM array, wherein the controller is configured to:
generate information that identifies data that is currently stored in the write cache of the data storage system;
store the information that identifies the data, but not the data itself in a data structure associated with the data storage system and separate from the write cache; and
based on detecting a failure of the data storage system that causes the data in the write cache to be lost, access the information in the data structure and based on the information accessed from the data structure, identify the data stored in the write cache that was lost as a result of the failure.

9. The data storage system of claim 8, wherein the data structure is a bitmap data structure in which each of a plurality of bits indicates whether or not a respective one of multiple logical unit numbers (LUNs) associated with the data storage system has lost data.

10. The data storage system of claim 8, wherein the data structure is a short-array data structure whose configuration specifies an amount of data lost within logical unit numbers (LUNs) associated with the data storage system.

11. The data storage system of claim 8, wherein the each time the data storage system writes data from the write cache to the non-volatile memory array the data storage system also updates the data structure.

12. The data storage system of claim 8, wherein the data storage system is configured to dynamically determine, based on a current situation, which of multiple different data structure configurations is utilized to implement the data structure.

13. The data storage system of claim 12, wherein the data storage system determines to implement the data structure as a short-array data structure when logical unit numbers (LUNs) associated with the data storage system are below a first predetermined number and determines to implement the data structure as a bitmap data structure when the number of LUNs exceeds a second predetermined number.

14. The data storage system of claim 8, wherein:
the data structure is a first data structure;
the data storage system is configure to clone the first data structure to at least a second data structure stored on a different physical device than the first data structure;
assign differing first and second generation numbers to the first and second data structures, respectively; and
update only one of the first and second data structure based on a given update to the write cache.

15. A computer program product, the computer program product comprising a computer readable storage medium having program instructions embodied therein, the program instructions executable by a controller of a data storage system including a non-volatile storage device and a memory cache, to cause the controller to:
generate information that identifies data that is currently stored in the write cache of the data storage system;
store the information that identifies the data, but not the data itself in a data structure associated with the data storage system and separate from the write cache; and
based on detecting a failure of the data storage system that causes the data in the write cache to be lost, access the information in the data structure and, based on the information accessed from the data structure, identify the data stored in the write cache that was lost as a result of the failure.

16. The computer program product of claim 15, wherein the data structure is a bitmap data structure whose configuration in which each of a plurality of bits indicates whether or not a respective one of multiple logical unit numbers (LUNs) associated with the data storage system has lost data.

17. The computer program product of claim 15, wherein the data structure is a short-array data structure whose configuration specifies an amount of data lost within logical unit numbers (LUNs) associated with the data storage system.

18. The computer program product of claim 15, wherein the program instruction cause the controller to update the data structure each time the data storage system writes data from the write cache to the non-volatile storage device.

19. The computer program product of claim 18, wherein the program instructions cause the controller to dynamically determine, based on a current situation, which of multiple different data structure configurations is utilized to implement the data structure.

20. The computer program product of claim 19, wherein the program instructions cause the data storage system to implement the data structure as a short-array data structure when logical unit numbers (LUNs) associated with the data storage system are below a first predetermined number and to implement the data structure as a bitmap data structure when the number of LUNs exceeds a second predetermined number.

* * * * *